United States Patent
Kim

(10) Patent No.: US 8,936,865 B2
(45) Date of Patent: *Jan. 20, 2015

(54) BUS BAR HOLDER AND BATTERY PACK INCLUDING THE SAME

(71) Applicants: Samsung SDI Co., Ltd., Yongin-si, Gyeonggi-do (KR); Robert Bosch GmbH, Stuttgart (DE)

(72) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,750

(22) Filed: Oct. 2, 2013

(65) Prior Publication Data

US 2014/0030581 A1    Jan. 30, 2014

Related U.S. Application Data

(63) Continuation of application No. 12/792,591, filed on Jun. 2, 2010, now Pat. No. 8,580,423.

(60) Provisional application No. 61/254,157, filed on Oct. 22, 2009.

(51) Int. Cl.
*H01M 2/26* (2006.01)
*H01M 2/20* (2006.01)
(Continued)

(52) U.S. Cl.
CPC ............ *H01M 2/204* (2013.01); *H01M 2/1061* (2013.01); *H01M 2/1072* (2013.01); *H01M 2/1077* (2013.01); *H01M 2/202* (2013.01);
(Continued)

(58) Field of Classification Search
USPC .................................. 429/161, 121, 122, 149
See application file for complete search history.

(56) References Cited

U.S. PATENT DOCUMENTS

| 5,643,693 A | 7/1997 | Hill et al. |
| 6,146,788 A | 11/2000 | Ikeda et al. |

(Continued)

FOREIGN PATENT DOCUMENTS

| JP | 2000-149909 | 5/2000 |
| JP | 2000-333343 | 11/2000 |

(Continued)

OTHER PUBLICATIONS

European Search Report dated Nov. 24, 2010, for corresponding European Patent application 10187206.7.
(Continued)

*Primary Examiner* — Jane Rhee
(74) *Attorney, Agent, or Firm* — Christie, Parker & Hale, LLP

(57) ABSTRACT

A battery pack includes a plurality of unit batteries; at least one bus bar electrically connecting electrode terminals of unit batteries of the plurality of unit batteries; and a bus bar holder including a holder body extending in a lengthwise direction, and at least one bus bar receiver on the holder body and mounting a respective bus bar of the at least one bus bar thereon, the at least one bus bar receiver having at least one connection hole formed therethrough, wherein the at least one bus bar is connected to an electrode terminal of the electrode terminals through the at least one connection hole.

18 Claims, 8 Drawing Sheets

(51) Int. Cl.
  *H01M 2/10*  (2006.01)
  *H01M 10/42*  (2006.01)
  *H01M 10/613*  (2014.01)
  *H01M 10/647*  (2014.01)
  *H01M 10/6554*  (2014.01)
  *H01M 10/6561*  (2014.01)
  *H01M 10/052*  (2010.01)

(52) U.S. Cl.
  CPC .......... *H01M 2/206* (2013.01); *H01M 10/4207* (2013.01); *H01M 10/5004* (2013.01); *H01M 10/5032* (2013.01); *H01M 10/5053* (2013.01); *H01M 10/5063* (2013.01); *H01M 10/052* (2013.01)
  USPC ............ 429/161; 429/149; 429/122; 429/121

(56) References Cited

U.S. PATENT DOCUMENTS

| | | | |
|---|---|---|---|
| 6,261,719 | B1 | 7/2001 | Ikeda et al. |
| 6,290,552 | B1 | 9/2001 | Saito et al. |
| 7,189,474 | B2 | 3/2007 | Hamada et al. |
| 2001/0049055 | A1 | 12/2001 | Saito |
| 2004/0058233 | A1 | 3/2004 | Hamada et al. |
| 2005/0031946 | A1 | 2/2005 | Kruger et al. |
| 2006/0214631 | A1 | 9/2006 | Yoon et al. |

FOREIGN PATENT DOCUMENTS

| | | |
|---|---|---|
| JP | 2001-332235 | 11/2001 |
| JP | 2002-164034 | 6/2002 |
| JP | 2003-100273 | 4/2003 |
| JP | 2004-111309 | 4/2004 |
| JP | 2007-299544 | 11/2007 |
| JP | 2008-166008 | 7/2008 |
| JP | 2009-231144 | 10/2009 |
| KR | 10-2006-0090469 A | 8/2006 |
| WO | WO 2007/102670 A1 | 9/2007 |

OTHER PUBLICATIONS

Japanese Office action dated Dec. 18, 2012, for corresponding Japanese Patent application 2010-209597, (2 pages).

Patent Abstracts of Japan, and English machine translation of Japanese Publication 2002-164034 listed above, (20 pages).

Patent Abstracts of Japan, and English machine translation of Japanese Publication 2003-100273 listed above, (27 pages).

Patent Abstracts of Japan, and English machine translation of Japanese Publication 2008-166008 listed above, (33 pages).

Patent Abstracts of Japan, and English machine translation of Japanese Publication 2009-231144 listed above, (8 pages).

SIPO Office action dated Jan. 30, 2014, with English translation, corresponding to Chinese Patent application 201010526590.3, (21 pages).

BUS BAR HOLDER AND BATTERY PACK INCLUDING THE SAME

CROSS-REFERENCE TO RELATED APPLICATION

This application is a continuation of U.S. patent application Ser. No. 12/792,591, filed on Jun. 2, 2010, which claims the benefit of U.S. Provisional Application No. 61/254,157, filed on Oct. 22, 2009 in the United States Patent and Trademark Office, the entire content of each of which is incorporated herein by reference.

BACKGROUND

1. Field

Aspects of embodiments of the present invention relate to a bus bar holder and a battery pack including the same, and more particularly, to a bus bar holder for supporting bus bars that electrically connect a plurality of unit battery cells to each other and a battery pack including the same.

2. Description of the Related Art

Rechargeable batteries, unlike primary batteries, are chargeable and dischargeable, and are widely used in high-end electronic devices such as cellular phones, notebook computers, or camcorders. In addition, rechargeable batteries are also used as a battery for automobiles.

A rechargeable battery includes an electrode assembly and an electrolyte. The electrode assembly includes a cathode plate, an anode plate, and a separator. In most rechargeable batteries, the electrolyte includes lithium ions. In the electrode assembly, each of the cathode plate and the anode plate may include an electrode tab protruding outside the electrode assembly.

The electrode assembly may be inserted into a case that may be cylindrical or tetragonal, and an electrode terminal may be exposed outside the case. The electrode tab protrudes outside the electrode assembly and is electrically connected to the electrode terminal.

A battery pack is typically formed by horizontally or vertically stacking a plurality of rechargeable batteries. In the battery pack, adjacent stacked rechargeable batteries may be electrically connected through their electrode terminals. For example, electrode terminals of adjacent rechargeable batteries may be electrically connected to each other by a bus bar.

SUMMARY

According to an aspect of embodiments of the present invention, in a bus bar holder and a battery pack including the same, a bus bar holder is configured to support bus bars for electrically connecting unit battery cells of a battery pack to each other efficiently and without or substantially without errors.

According to one embodiment of the present invention, a battery pack includes: a plurality of unit batteries; at least one bus bar electrically connecting electrode terminals of unit batteries of the plurality of unit batteries; and a bus bar holder including a holder body extending in a lengthwise direction, and at least one bus bar receiver on the holder body and mounting a respective bus bar of the at least one bus bar thereon, the at least one bus bar receiver having at least one connection hole formed therethrough, wherein the at least one bus bar is connected to an electrode terminal of the electrode terminals through the at least one connection hole.

In one embodiment, the at least one bus bar receiver includes a support hook coupling the at least one bus bar to the at least one bus bar receiver and supporting the at least one bus bar in a direction substantially perpendicular to the lengthwise direction.

In one embodiment, the at least one bus bar receiver includes a support groove receiving a portion of the at least one bus bar therein and supporting the at least one bus bar in a direction substantially perpendicular to the lengthwise direction.

In one embodiment, the holder body includes a first portion extending in the lengthwise direction and a second portion extending in the lengthwise direction and being substantially perpendicular to the first portion, the at least one bus bar receiver includes a first surface on the first portion of the holder body and a second surface on the second portion of the holder body, and the at least one connection hole is formed through the first surface. The at least one bus bar receiver may further include a support rib on at least one of the first surface or the second surface and supporting the at least one bus bar in the lengthwise direction.

The at least one bus bar may include a junction portion contacting the first surface of the at least one bus bar receiver and electrically connecting the electrode terminals of the unit batteries; and a support portion substantially perpendicular to the junction portion and contacting the second surface of the at least one bus bar receiver. The junction portion may be welded to the electrode terminals of the unit batteries. The at least one bus bar may further include a connection portion electrically connected to a connection terminal of the battery pack. The connection portion may be an opening formed in the support portion. The connection portion may be a threaded opening, and the connection terminal may be threadedly coupled to the connection portion.

The connection terminal may be configured to be electrically connected to a battery management system (BMS) of the battery pack through a connection wire. The at least one bus bar receiver may further include a first rib supporting the connection wire in a first direction that is substantially perpendicular to the lengthwise direction and a second rib supporting the connection wire in a second direction that is opposite the first direction.

In one embodiment, the at least one bus bar receiver includes a plurality of bus bar receivers spaced from one another in the lengthwise direction, and the at least one bus bar includes a plurality of bus bars mounted on respective ones of the plurality of bus bar receivers. The holder body may have a heat transfer opening through the holder body between adjacent bus bar receivers of the plurality of bus bar receivers, the heat transfer opening configured to pass a heat transfer medium therethrough.

In one embodiment, the bus bar holder further includes a cover rotatably coupled to the holder body about an axis extending in the lengthwise direction, the cover being rotatable between an open position in which access is provided to the at least one bus bar receiver and a closed position in which the cover covers the at least one bus bar receiver.

Unit batteries of the plurality of unit batteries may be stacked in the lengthwise direction to form the battery pack.

According to another embodiment of the present invention, a bus bar holder includes: a holder body including a first portion extending in a lengthwise direction and a second portion extending in the lengthwise direction and being substantially perpendicular to the first portion; and at least one bus bar receiver on the holder body and configured to mount a bus bar thereon for electrically connecting unit batteries of a battery pack, the at least one bus bar receiver including a first surface on the first portion of the holder body, and a second surface on the second portion of the holder body, wherein the first surface has at least one connection hole formed therethrough for connecting the bus bar to an electrode terminal of a unit battery of the unit batteries.

In one embodiment, the at least one bus bar receiver further includes a support hook configured to couple the bus bar to the at least one bus bar receiver and support the bus bar in a direction substantially perpendicular to the lengthwise direction.

In one embodiment, the at least one bus bar receiver further includes a support groove configured to receive a portion of the bus bar therein and support the bus bar in a direction substantially perpendicular to the lengthwise direction.

In one embodiment, the at least one bus bar receiver further includes a support rib on at least one of the first surface or the second surface and configured to support the bus bar in the lengthwise direction.

According to another aspect of embodiments of the present invention, with respect to a battery pack including at least one unit battery cell, a connection operation of electrically connecting unit battery cells to each other using bus bars may be efficiently performed without or substantially without errors via a bus bar holder.

BRIEF DESCRIPTION OF THE DRAWINGS

The above and other features and advantages of the present invention will become more apparent by describing in detail some exemplary embodiments thereof with reference to the attached drawings in which.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention.

Figure 1:
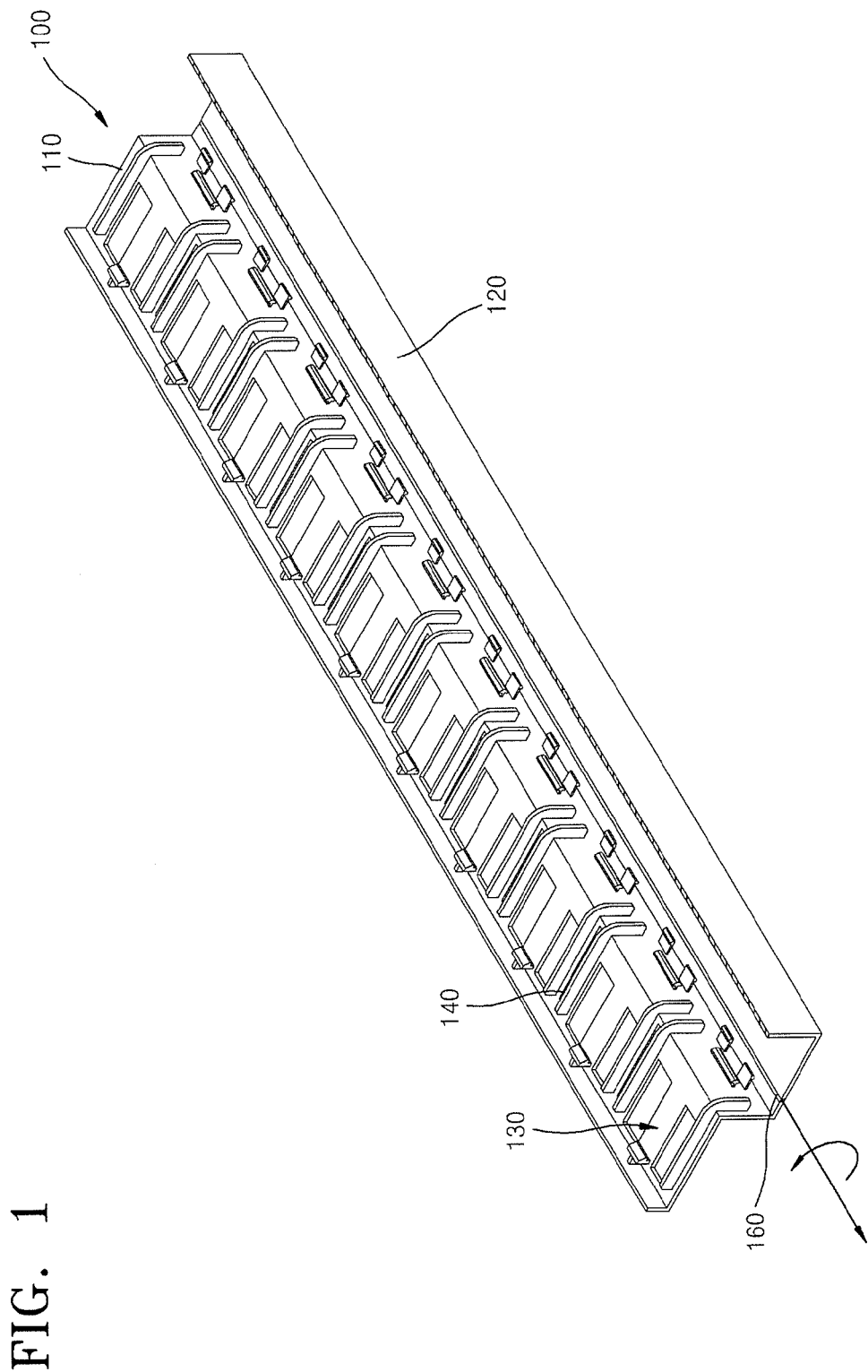
FIG. 1 is a perspective view of a bus bar holder according to an embodiment of the present invention.
Figure 2:
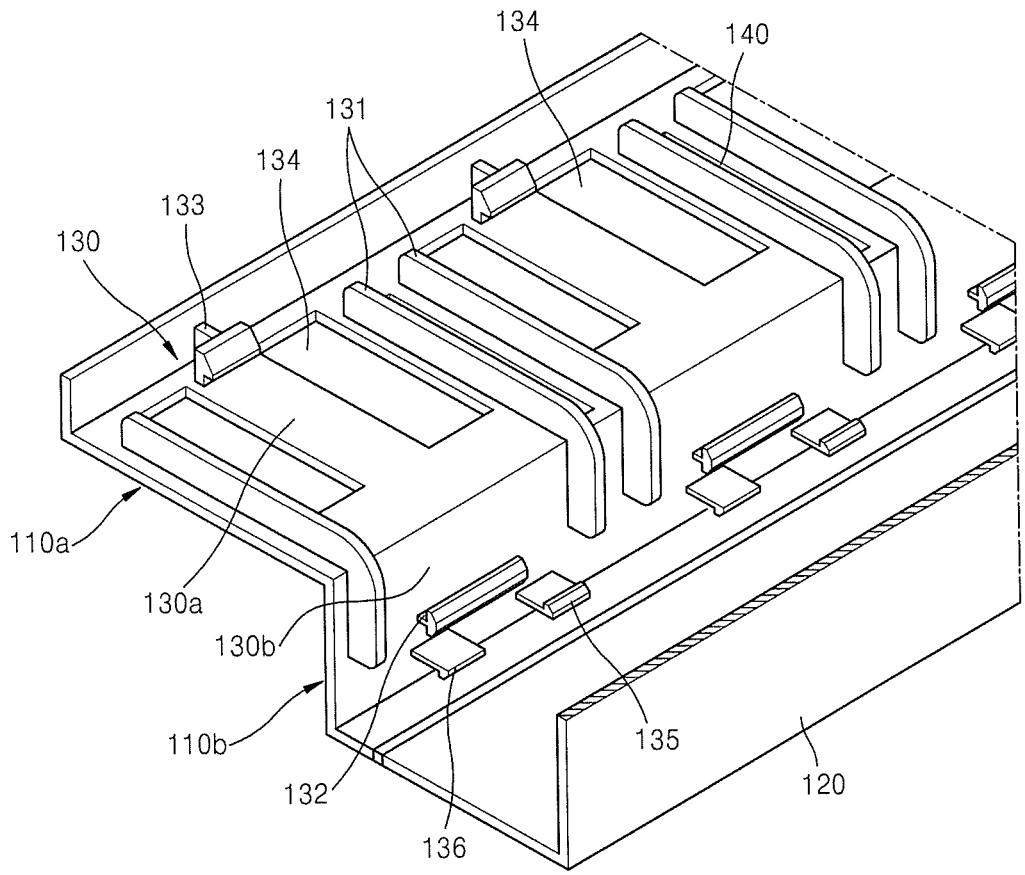
FIG. 2 is a detailed view of a bus bar receiver of the bus bar holder of FIG. 1.

FIG. 1 is a perspective view of a bus bar holder 100 according to an embodiment of the present invention; FIG. 2 is a view of a bus bar receiver 130 of the bus bar holder 100 of FIG. 1 on which a bus bar 200 is mountable; and FIG. 3 is a perspective view of the bus bar 200 that is mountable on the bus bar holder 100 of FIG. 1, according to an embodiment of the present invention.

Figure 3:
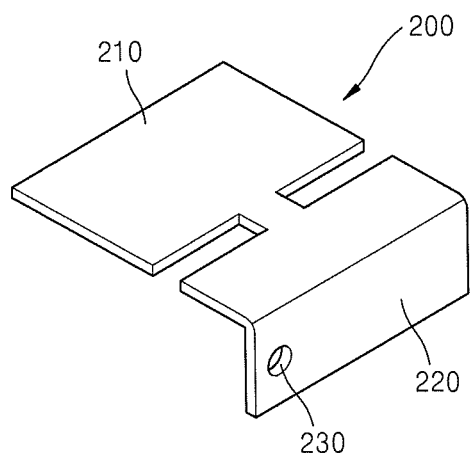
FIG. 3 is a perspective view of a bus bar that is mountable on a bus bar holder according to an embodiment of the present invention.

Referring to FIGS. 1 through 3, the bus bar holder 100, in one embodiment, includes a holder body 110 and a cover 120. In an exemplary embodiment, the holder body 110 is configured such that one or more of the bus bars 200 may be mounted on the holder body 110. The cover 120, in one embodiment, is configured to cover the holder body 110 on which the bus bars 200 are mounted.

In a battery pack formed by stacking a plurality of unit battery cells, the bus bar holder 100 may be disposed on the stacked unit battery cells. The bus bar holder 100, in one embodiment, supports each of the bus bars 200 such that relative positions of the bus bars 200 may be stably and easily fixed, thereby preventing or substantially preventing an accident caused by careless operation.

According to an exemplary embodiment, one or more of the bus bars 200 may be mounted on the holder body 110. For mounting the bus bars 200, the holder body 110, in one embodiment, includes a plurality of bus bar receivers 130 configured to mount the bus bars 200 respectively thereon. In another embodiment, the holder body 110 may include a single bus bar receiver 130 disposed on two stacked unit battery cells.

The holder body 110, in one embodiment, extends in one direction. Further, in one embodiment, the bus bar receivers 130 are arranged in the direction in which the holder body 110 extends. For example, the holder body 110 may extend in a direction in which unit battery cells are stacked.

The holder body 110, in one embodiment, extends in a direction and has a cross-sectional shape in a plane through the direction of an inverted L-shape (e.g., a shape like the Korean consonant "ㄱ") and thus is configured to cover corners of the stacked unit battery cells. In one embodiment, the bus bar receivers 130 also have an inverted L-shape (e.g., a shape like the Korean consonant "ㄱ"). However, the shape of the bus bar receivers 130 is not limited thereto and, in other embodiments, the bus bar receivers 130 may have other suitable shapes.

The bus bar receivers 130, in one embodiment, each have a first surface 130a corresponding to a first surface (e.g., a top surface) of stacked unit battery cells and a second surface 130b corresponding to a second surface (e.g., a side surface) of the stacked unit battery cells. The first surface 130a, in one embodiment, contacts a junction portion 210 of the bus bar 200, and the second surface 130b contacts a support portion 220 of the bus bar 200. The first surface 130a and the second surface 130b of the bus bar receiver 130, in one embodiment, are continuous along the corners of the stacked unit battery cells in such a way that a structure formed by the first surface 130a and the second surface 130b is bent.

In one embodiment, the holder body 110 includes a first portion 110a and a second portion 110b. In one embodiment, the first portion 110a extends in the lengthwise direction of the holder body 110, and the second portion 110b extends in the lengthwise direction and is substantially perpendicular to the first portion 110a. Also, the first surface 130a may be on the first portion 110a of the holder body 110, and the second surface 130b may be on the second portion 110b of the holder body 110. One or more connection holes 134, in one embodiment, are formed through the first surface 130a.

The bus bar holder 100, in one embodiment, is disposed on electrode terminals of the stacked unit battery cells, which are exposed outside. In one embodiment, a bus bar 200 mounted on a corresponding bus bar receiver 130 may be disposed on electrode terminals of adjacent unit battery cells.

Each of the bus bar receivers 130, in one embodiment, includes support ribs 131, a support groove 132, a support hook 133, a connection hole 134, a first rib 135, and a second rib 136.

The support ribs 131 are configured to prevent or substantially prevent the bus bar 200 from moving in the lengthwise direction of the holder body 110 in which the holder body 110 extends. The support groove 132 is configured to support the bus bar 200 and restrain the bus bar 200 in at least one other direction (e.g., at least one other direction substantially perpendicular to the lengthwise direction of the holder body 110). The support hook 133 is configured to support the bus bar 200 and restrain the bus bar 200 in yet at least one other direction (e.g., at least one other direction substantially perpendicular to the lengthwise direction of the holder body 110).

The connection hole 134, in one embodiment, is formed in such a way that the holder body 110 is disposed on electrode terminals of unit battery cells. The first rib 135 and the second rib 136 are configured to support a connection wire 152 which, in one embodiment, is connected to a connection portion 230 of the bus bar 200.

The support ribs 131, in one embodiment, extend along the first surface 130a and the second surface 130b of the bus bar receiver 130 in a direction perpendicular or substantially perpendicular to the extension, or lengthwise, direction of the holder body 110. The support ribs 131 are configured to prevent the bus bar 200 mounted on the bus bar receiver 130 from moving in the lengthwise direction of the holder body 110.

The support ribs 131, in one embodiment, are disposed in the direction perpendicular or substantially perpendicular to the lengthwise direction of the holder body 110 in which the holder body 110 extends and protrude from the first surface 130a and the second surface 130b of the bus bar receiver 130. The support ribs 131, in one embodiment, are formed at opposite ends of the bus bar receiver 130 in the lengthwise direction of the bus bar receiver 130.

The support groove 132, in one embodiment, is formed on the second surface 130b of the bus bar receiver 130 and supports the support portion 220 of the bus bar 200. The support groove 132, in one embodiment, is formed as a groove in a protrusion on the second surface 130b of the holder body 110 in the lengthwise direction of the holder body 110.

The support hook 133, in one embodiment, is formed on the first surface 130a of the bus bar receiver 130 and supports the junction portion 210 of the bus bar 200. The support hook 133, in one embodiment, protrudes from the first surface 130a and has a hook shape.

Figure 6:
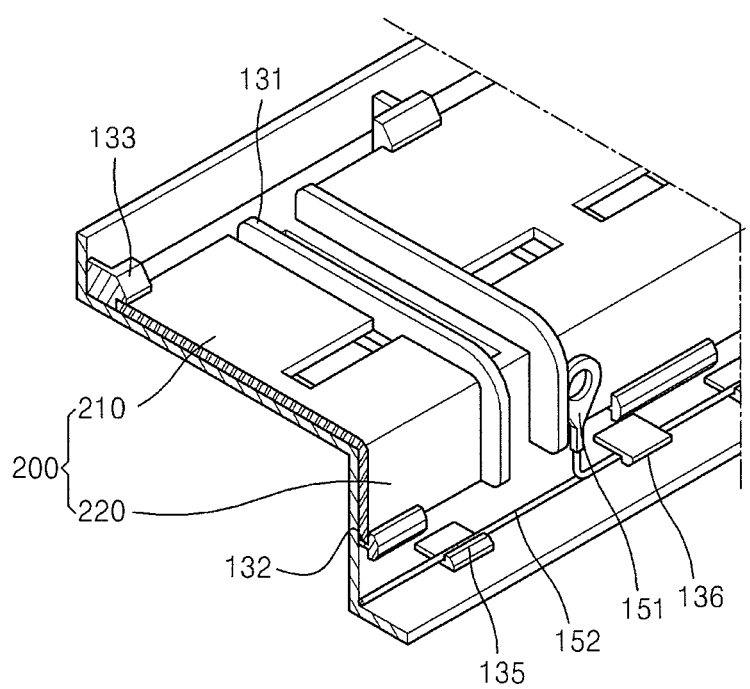
FIG. 6 is a sectional view of a bus bar mounted on and supported by a bus bar receiver of the bus bar holder of FIG. 1.

The bus bar 200, according to one embodiment, is mounted on the bus bar receiver 130 by inserting an end of the support portion 220 of the bus bar 200 into the support groove 132 and pressing an end of the junction portion 210 of the bus bar 200 to be captured by the support hook 133 (see FIG. 6). Thus, the bus bar 200 on the first surface 130a and the second surface 130b of the bus bar receiver 130 is supported and retained by the support groove 132 and the support hook 133.

The bus bar 200, in one embodiment, is fixed to the bus bar receiver 130 since opposite side surfaces of the bus bar 200 are mounted on the bus bar receiver 130 and supported and retained by the support ribs 131, the end of the support portion 220 of the bus bar 200 is supported and retained by the support groove 132, and the end of the junction portion 210 of the bus bar 200 is supported and retained by the support hook 133.

According to an embodiment of the present invention, in the bus bar holder 100, the support groove 132 and the support hook 133 allow the bus bar 200 to be quickly and easily mounted on the bus bar receiver 130 (e.g., by hook-coupling) and prevent or substantially prevent displacement of the bus bar 200 from the first surface 130a and the second surface 130b of the bus bar receiver 130.

In addition, in one embodiment, the bus bars 200 are mounted on the bus bar holder 100 to manufacture a sub-assembly and the bus bars 200 are subsequently coupled to (e.g., welded to) electrode terminals of unit battery cells, such that connection of the bus bars 200 is efficiently and accurately performed.

The connection hole 134, in one embodiment, is an opening (e.g., a through-hole) in the holder body 110 formed in a portion of the first surface 130a of the bus bar receiver 130 corresponding to the junction portion 210 of the bus bar 200. In one embodiment, the bus bar 200 mounted on the bus bar receiver 130 is connected to electrode terminals of unit battery cells through the connection hole 134.

The number of connection holes 134, in one embodiment, is selected depending on the number of electrode terminals that are to be connected to the bus bar 200. For example, if the bus bar 200 is welded, or otherwise connected, to electrode terminals of two adjacent unit battery cells, two connection holes 134 may be formed in portions of the first surface 130a respectively corresponding to the electrode terminals of the two adjacent unit battery cells.

Figure 5:
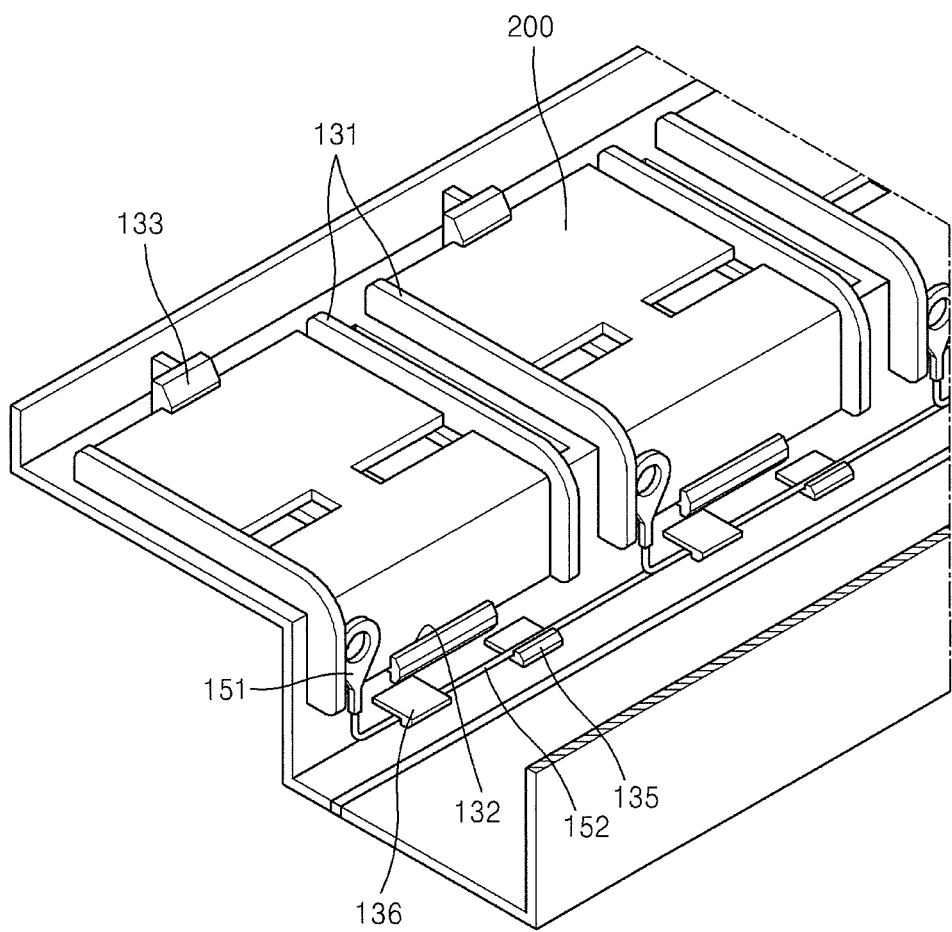
FIG. 5 is a detailed view of bus bars mounted on and supported by bus bar receivers of the bus bar holder of FIG. 1.

The connection portion 230 of the bus bar 200, in one embodiment, is connected to a connection terminal 151, and the connection terminal 151 may be connected to the outside through a connection wire 152 (see FIG. 5). In one embodiment, the connection wire 152 is electrically connected to a battery management system (BMS) that is disposed inside or outside the bus bar holder 100.

In one embodiment, the first rib 135 and the second rib 136 support the connection wire 152 running out of the connection terminal 151 through the connection portion 230 of the bus bar 200 (see FIG. 5). The first rib 135 and the second rib 136, in one embodiment, are configured to stably support the connection wire 152, even when an impact or vibration is applied to the assembled structure.

The first rib 135 and the second rib 136, in one embodiment, support the connection wire 152 in upward and downward directions, respectively. Each of the first rib 135 and the second rib 136, in one embodiment, has a groove extending in the lengthwise direction of the holder body 110 in order to stably support the connection wire 152.

According to one embodiment, the first rib 135 supports the connection wire 152 in an upward direction, and the second rib 136 supports the connection wire 152 in a downward direction (see FIG. 5). However, the present invention is not limited thereto. For example, the first rib 135 may support the connection wire 152 in a downward direction, and the second rib 136 may support the connection wire 152 in an upward direction.

Further, in one embodiment, the bus bar holder 100 includes an air pathway 140. The air pathway 140, in one embodiment, is disposed between adjacent bus bar receivers 130. In one embodiment, the air pathway 140 is formed in the holder body 110 and has a slit shape. For example, the air pathway 140 may have a slit shape extending in a direction perpendicular to the lengthwise direction of the holder body 110 between the support ribs 131 of adjacent bus bar receivers 130. Alternatively, the air pathway 140 may have any other suitable shape and/or location for passing airflow therethrough for cooling the unit battery cells.

In one embodiment, when the bus bar holder 100 is disposed on stacked unit battery cells, the air pathway 140 is disposed between adjacent unit battery cells. Thus, air flowing between adjacent unit battery cells may flow through the air pathway 140. Thus, unit battery cells may be easily cooled by the airflow.

The bus bar 200 is configured to electrically connect electrode terminals of unit battery cells to each other. In one embodiment, a single bus bar 200 electrically connects electrode terminals of two adjacent stacked unit battery cells. However, the present invention is not limited thereto. For example, in another embodiment, a single bus bar 200 may electrically connect three or more unit battery cells to each other.

The bus bar 200, in one embodiment, includes the junction portion 210, the support portion 220, and the connection portion 230.

The junction portion 210, in one embodiment, is connected to (e.g., welded to) electrode terminals of adjacent unit battery cells. The support portion 220, in one embodiment, is supported on the bus bar receiver 130 in such a way that movement in at least one direction is restrained. The connection portion 230, in one embodiment, is electrically connected to the outside and may be a terminal for electrical connection to measure voltage and/or temperature.

When the junction portion 210 is mounted on the bus bar receiver 130 (e.g., on the first surface 130a), a surface of the junction portion 210 may be connected to electrode terminals of adjacent unit battery cells. For example, in one embodiment, the junction portion 210 is connected to electrode terminals of adjacent unit battery cells by laser welding or ultrasonic welding. In other embodiments, the junction portion 210 may be connected to electrode terminals of adjacent unit battery cells by other types of welding, soldering, or any other suitable device or method.

The support portion 220 and the junction portion 210, in one embodiment, are integrally formed such that a structure formed by the support portion 220 and the junction portion 210, in a cross-section, has an inverted L-shape (e.g., a shape like the Korean consonant "ㄱ"). Thus, in one embodiment, the junction portion 210 is supported by the first surface 130a of the bus bar receiver 130, and the support portion 220 is supported by the second surface 130b of the bus bar receiver 130, wherein the second surface 130b of the bus bar receiver 130 is connected to the first surface 130a such that a structure formed by the first and second surfaces 130a and 130b has an inverted L-shape (e.g., a shape like the Korean consonant "ㄱ"). As a result, in the above-described embodiment, movement of the bus bar 200 in a direction perpendicular to the first surface 130a of the bus bar receiver 130 and also in a direction perpendicular to the second surface 130b of the bus bar receiver 130 is hindered, and the bus bar 200 is thereby fixed.

Although the shape of the junction portion 210 and the support portion 220 is described above as having an inverted L-shape in one embodiment, the present invention is not limited thereto and may vary in other embodiments.

The connection portion 230, in one embodiment, is electrically connected to the outside and functions as an electrical connection terminal, such as for measuring voltage and/or temperature. Unit battery cells, in one embodiment, are electrically connected to the BMS through the connection portion 230, wherein the BMS is disposed inside or outside the bus bar holder 100. As described above, since unit battery cells are controlled by the BMS according to one embodiment, the performance of unit battery cells may be improved.

The BMS, in one embodiment, includes a circuit for maintaining a potential difference between unit battery cells at an appropriate level and preventing over-charging, over-discharging, and excess current. The BMS may be installed on a separate printed circuit board (PCB), and the PCB may be disposed inside or outside the bus bar holder 100.

In one embodiment, the connection portion 230 is connected to the connection terminal 151, the connection terminal 151 is connected to the outside through the connection wire 152, and the connection wire 152 is electrically connected to the BMS.

The connection portion 230, in one embodiment, is an opening (e.g., a through-hole) formed in a portion of the support portion 220. The connection terminal 151, in one embodiment, includes a protrusion having a shape such that the connection terminal 151 can be inserted into the connection portion 230. That is, the connection portion 230 may be connected to the connection terminal 151 by inserting the connection terminal 151 into the connection portion 230.

According to another embodiment of the present invention, a screw thread is formed on an inner surface of the connection portion 230, and a screw-thread is formed on the protrusion of the connection terminal 151, such that the protrusion of the connection terminal 151 may be screw-coupled to the connection portion 230. Additionally or in other embodiments, the connection portion 230 and the connection terminal 151 may be electrically and mechanically connected to each other by soldering, welding, or any other suitable connection device or method.

According to the above-described embodiment, even when an external force such as an impact or vibration is applied to the assembled structure, the electrical and mechanical connection between the connection portion 230 and the connection terminal 151 may be stably maintained.

Figure 4:
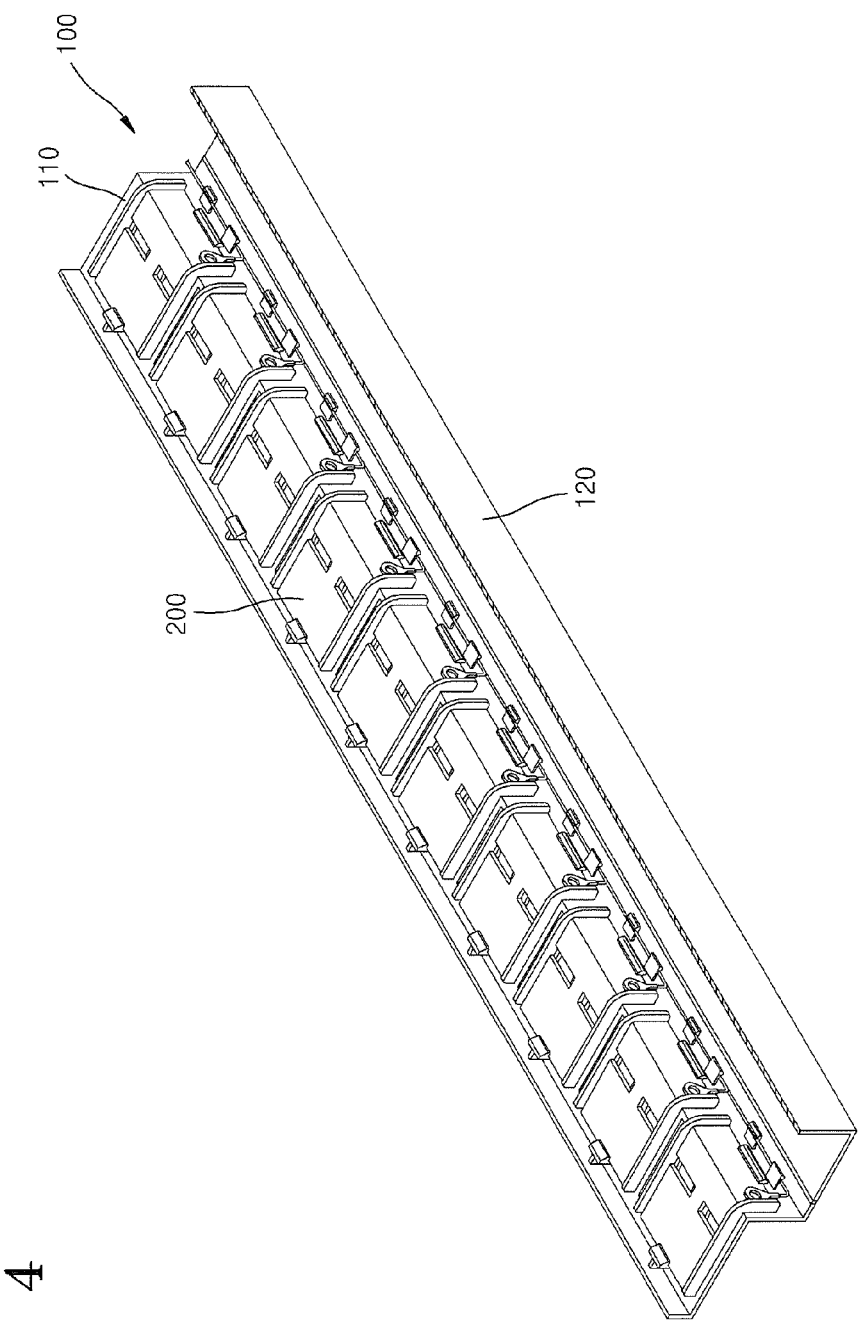
FIG. 4 is a schematic perspective view of bus bars respectively mounted on bus bar receivers of the bus bar holder of FIG. 1.

FIG. 4 is a schematic perspective view of bus bars 200 respectively mounted on bus bar receivers 130 of the bus bar holder 100. FIG. 5 is a detailed view of the bus bars 200 mounted on and supported by the bus bar receivers 130. FIG. 6 is a cross-sectional view of one of the bus bars 200 mounted on and supported by one of the bus bar receivers 130.

The cover 120, in one embodiment, is configured to cover a surface of the holder body 110 on which the bus bar 200 is mounted. When the cover 120 covers the surface of the holder body 110 and the bus bar 200 is mounted on the bus bar holder 100, the bus bar 200 is not exposed to the outside. Thus, a short circuit caused by a conductor dropping onto the bus bar 200 from the outside may be prevented or substantially prevented.

Referring to FIGS. 1 through 6, the cover 120 may be connected to one side of the holder body 110 such that the cover 120 is rotatable with respect to a coupling axis, such as a coupling shaft 160, so that the cover 120 covers a surface of the holder body 110 on which the bus bar 200 is mounted. Thus, in one embodiment, the cover 120 is easily handled and may precisely cover the holder body 110.

The coupling shaft 160, in one embodiment, is connected to a side of the holder body 110 and extends in the lengthwise direction of the holder body 110. In this regard, a connection portion between the cover 120 and the holder body 110 may be the coupling shaft 160 of the cover 120.

According to an embodiment of the present invention, with respect to a battery pack including at least one unit battery cell, a connection operation of electrically connecting unit battery cells to each other using bus bars may be efficiently performed without or substantially without errors.

Figure 7:
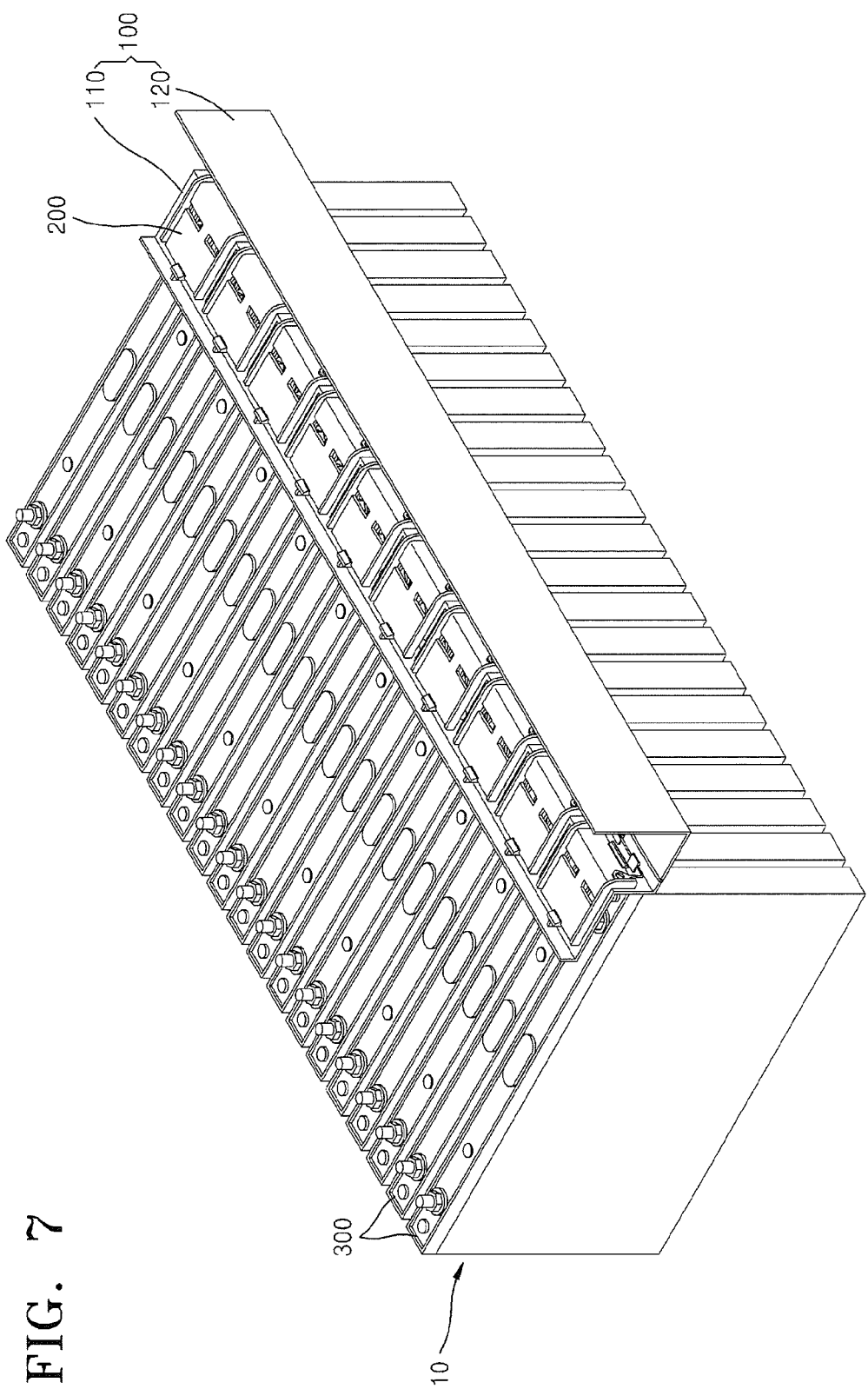
FIG. 7 is a schematic perspective view of a battery pack including unit battery cells stacked in a horizontal direction and further including the bus bar holder of FIGS. 1-6 mounted thereon.
Figure 8:
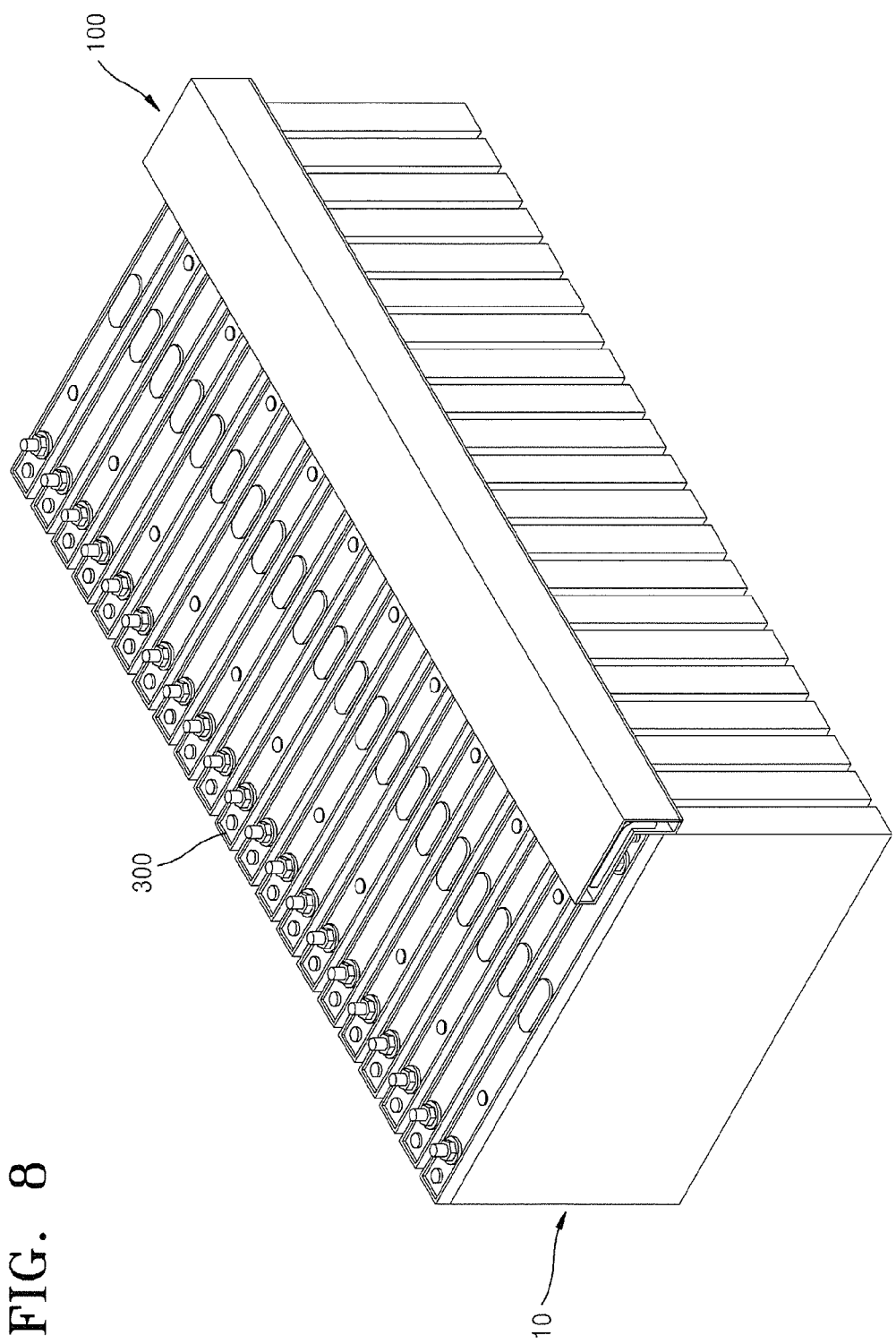
FIG. 8 is a schematic perspective view of the battery pack of FIG. 7 in which a cover of the bus bar holder is shown covering a holder body of the bus bar holder.
Figure 9:
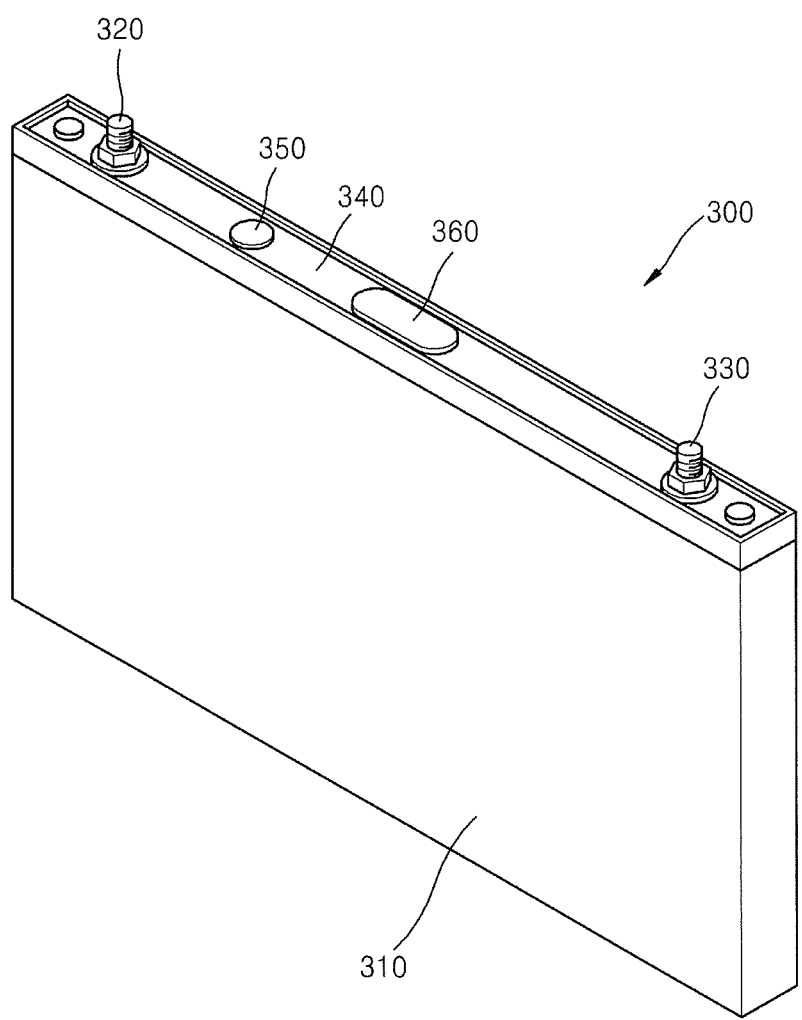
FIG. 9 is a perspective view of one of the unit battery cells of the battery pack of FIG. 7.

FIG. 7 is a schematic perspective view of a battery pack 10 including unit battery cells 300 stacked in a horizontal direction on which the bus bar holder 100 is mounted, wherein the cover 120 is opened with respect to the holder body 110. FIG. 8 is a schematic perspective view of the battery pack 10 including the bus bar holder 100, illustrating the cover 120 covering the holder body 110. FIG. 9 is a perspective view of one of the unit battery cells 300 of the battery pack 10.

Referring to FIGS. 7-9, the battery pack 10, in one embodiment, includes the bus bar holder 100, the bus bar 200, and the unit battery cells 300. The bus bar holder 100 and the bus bar 200 have been described with reference to FIGS. 1-6, and thus will not be described herein in detail.

The bus bar holder 100, in one embodiment, supports at least one bus bar 200 and is disposed on the stacked unit battery cells 300. Further, the bus bar 200, in one embodiment, electrically connects electrode terminals of adjacent stacked unit battery cells to each other. The unit battery cells 300 may be stacked in one direction.

According to the above-described embodiment, the bus bar holder 100 supports the bus bars 200 and allows the bus bars 200 to be simultaneously disposed on the stacked unit battery cells 300. That is, the bus bar holder 100 fixes each of the bus bars 200 to the corresponding bus bar receiver 130 (see FIG. 1), and thus allows all of the bus bars 200 to be disposed on the electrode terminals of the unit battery cells 300 at once.

According to one embodiment, when all of the bus bars 200 are disposed with respect to electrode terminals in welding positions, the bus bars 200 are welded to the electrode terminals. In this regard, since relative positions of the bus bars 200 are stably and easily fixed by the bus bar holder 100, any accident caused by careless operation may be prevented or reduced.

In addition, since, in one embodiment, the bus bars 200 are mounted on the bus bar holder 100 to manufacture a sub-assembly and the bus bars 200 are subsequently welded to the electrode terminals of the unit battery cells 300, connection of the bus bars 200 may be efficiently performed and the connection time may be reduced.

As illustrated in FIGS. 7 and 8, the unit battery cells 300 may be stacked in a horizontal direction to form the battery pack 10. In one embodiment, the electrode terminals of the unit battery cells 300 are exposed in one direction (e.g., top surfaces of the unit battery cells 300 are exposed), and the bus bar holder 100 covers the electrode terminals of the unit battery cells 300.

Referring to FIGS. 1 through 9, the bus bar holder 100, in one embodiment, covers corners of one side or opposite sides of a surface (e.g., the top surface) of each of the stacked unit battery cells 300 so that the bus bar holder 100 is stably supported by the stacked unit battery cells 300. That is, the bus bar holder 100 may be disposed at one side or opposite sides of the unit battery cells 300 that extend and are stacked in the lengthwise direction of the bus bar holder 100 in which the unit battery cells are stacked.

The bus bar holder 100, in one embodiment, includes the holder body 110 for supporting the bus bars 200, and the cover 120 for covering at least a portion of the holder body 110 on which the bus bars 200 are mounted.

The holder body 110, in one embodiment, includes the bus bar receivers 130 on which the bus bars 200 are respectively mounted. In one embodiment, the bus bar receiver 130 is disposed on two stacked unit battery cells 300, and the bus bar 200 is disposed on two electrode terminals of the two stacked unit battery cells 300.

Further, in one embodiment, the bus bar holder 100 includes the air pathway 140 interposed between adjacent bus bar receivers 130. The air pathway 140, in one embodiment as described above, is formed in the holder body 110 and has a slit shape.

The air pathway 140, in one embodiment, is disposed between adjacent unit battery cells 300 so that air flowing between the adjacent unit battery cells 300 may flow through the air pathway 140. As a result, according to an embodiment of the present invention, the unit battery cells 300 may be easily cooled by the airflow.

The cover 120, in one embodiment, is connected to a side of the holder body 110 such that the cover 120 is rotatable with respect to the coupling shaft 160 so that the cover 120 covers at least a surface of the holder body 110 on which the bus bar 200 is mounted. Thus, the cover 120 is easily handled and precisely covers the holder body 110.

Due to the cover 120, the bus bars 200 are mounted inside the bus bar holder 100, in one embodiment, and thus the bus bars 200 are not exposed to the outside. Thus, a short circuit caused by a conductor dropping onto the bus bar 200 from the outside may be prevented or reduced.

The bus bar 200, in one embodiment, is configured having a shape that can be mounted on the bus bar receiver 130. Further, a single bus bar 200 may electrically connect two adjacent unit battery cells 300 to each other.

The unit battery cells 300 may be stacked in the horizontal direction to form the battery pack 10, and as illustrated in the drawings, a conventional tetragonal battery cell may be used. However, embodiments of the present invention are not limited thereto. For example, various battery cell shapes may also be used including cylindrical battery cells.

The unit battery cells 300 may be conventional rechargeable batteries, where a rechargeable battery may include an electrode assembly and an electrolyte. The electrode assembly may include a cathode plate, an anode plate, and a separator. The electrolyte may include lithium ions. In the electrode assembly, each of the cathode plate and the anode plate may include an electrode tab.

The electrode assembly, in one embodiment, is inserted into a case 310, and electrode terminals 320 and 330 are exposed outside the case 310 (see FIG. 9). The electrode tabs may protrude outside the electrode assembly and may be electrically connected to the electrode terminals 320 and 330. The case 310, in one embodiment, is tetragonal in shape, but alternatively, may be cylindrical or have any other suitable shape.

A plurality of rechargeable batteries may be stacked in a horizontal or vertical direction to form a battery pack. In one embodiment of the battery pack, the electrode terminals 320 and 330 of adjacently stacked rechargeable batteries are electrically connected to each other. For example, in one embodiment, the electrode terminals 320 and 330 of the adjacently stacked rechargeable batteries are electrically connected to each other by the bus bars 200.

With further reference to FIG. 9, the case 310, in one embodiment, has an opening through which the electrode assembly is received and to which a cap plate 340 is coupled. The cap plate 340, in one embodiment, is a thin plate and has an electrolyte inlet hole through which the electrolyte may be loaded. Further, in one embodiment, the electrolyte inlet hole is plugged with a sealing plug 350. In addition, in one embodiment, the cap plate 340 has a vent member 360 in which a groove is formed so that the vent member 360 is destroyable according to a predetermined internal pressure in the case 310.

While the present invention has been particularly shown and described with reference to some exemplary embodiments thereof, it will be understood by those of ordinary skill in the art that various changes in form and details may be made therein without departing from the spirit and scope of the present invention as set forth in the following claims.

What is claimed is:

1. A battery pack comprising:
   a plurality of unit batteries arranged in a lengthwise direction;
   a plurality of bus bars electrically connecting electrode terminals of unit batteries of the plurality of unit batteries; and
   a bus bar holder comprising:
      a holder body extending in the lengthwise direction;
      a plurality of bus bar receivers arranged in a row in the lengthwise direction on the holder body and mounting the plurality of bus bars thereon, a respective bus bar receiver of the plurality of bus bar receivers having at least one connection hole formed through each of a base surface of the respective bus bar receiver facing the plurality of unit batteries and an outer surface of the respective bus bar receiver opposite the base surface and facing away from the plurality of unit batteries, a respective bus bar of the plurality of bus bars being supported on the outer surface of the respective bus bar receiver; and
      at least one support protrusion protruding from the outer surface of the respective bus bar receiver and supporting the respective bus bar in at least one of the lengthwise direction or a widthwise direction perpendicular to the lengthwise direction,
   wherein the respective bus bar is connected to an electrode terminal of the electrode terminals through the at least one connection hole.

2. The battery pack of claim 1, wherein the at least one support protrusion comprises a support hook.

3. The battery pack of claim 2, wherein the support hook supports the respective bus bar in the widthwise direction.

4. The battery pack of claim 2, wherein the at least one support protrusion further comprises a support groove opposite the support hook.

5. The battery pack of claim 1, wherein the at least one support protrusion comprises a support rib.

6. The battery pack of claim 5, wherein the support rib supports the respective bus bar in the lengthwise direction.

7. The battery pack of claim 1, wherein the at least one support protrusion comprises a support groove receiving a portion of the respective bus bar therein and supporting the respective bus bar.

8. The battery pack of claim 1, wherein the at least one support protrusion comprises a first support protrusion supporting the respective bus bar in the lengthwise direction, and a second support protrusion supporting the respective bus bar in the widthwise direction.

9. The battery pack of claim 1, wherein the holder body comprises a first portion extending in the lengthwise direction, and a second portion extending in the lengthwise direction and being substantially perpendicular to the first portion, the outer surface of the respective bus bar receiver comprises a first surface on the first portion of the holder body and a second surface on the second portion of the holder body, and the at least one connection hole is formed through the first surface.

10. The battery pack of claim 9, wherein the respective bus bar comprises:
   a junction portion contacting the first surface of the respective bus bar receiver and electrically connecting the electrode terminals of the unit batteries; and
   a support portion substantially perpendicular to the junction portion and contacting the second surface of the respective bus bar receiver.

11. The battery pack of claim 10, wherein the junction portion is welded to the electrode terminals of the unit batteries.

12. The battery pack of claim 10, wherein the respective bus bar further comprises a connection portion electrically connected to a connection terminal of the battery pack.

13. The battery pack of claim 12, wherein the connection portion is an opening formed in the support portion.

14. The battery pack of claim 12, wherein the connection portion is a threaded opening, and the connection terminal is threadedly coupled to the connection portion.

15. The battery pack of claim 12, wherein the connection terminal is configured to be electrically connected to a battery management system (BMS) of the battery pack through a connection wire.

16. The battery pack of claim 15, wherein the respective bus bar receiver further comprises a first rib supporting the connection wire in a first direction that is substantially perpendicular to the lengthwise direction and a second rib supporting the connection wire in a second direction that is opposite the first direction.

17. The battery pack of claim 1, wherein the holder body has a heat transfer opening through the holder body between adjacent bus bar receivers of the plurality of bus bar receivers, the heat transfer opening configured to pass a heat transfer medium therethrough.

18. The battery pack of claim 1, wherein the bus bar holder further comprises a cover rotatably coupled to the holder body about an axis extending in the lengthwise direction, the cover being rotatable between an open position in which access is provided to the plurality of bus bar receivers and a closed position in Mich the cover covers the plurality of bus bar receivers.

* * * * *